(No Model.)
J. W. STEEVES & G. A. STEWART.
AUTOMATIC OYSTER OR CLAM TONGS.
No. 588,539. Patented Aug. 17, 1897.
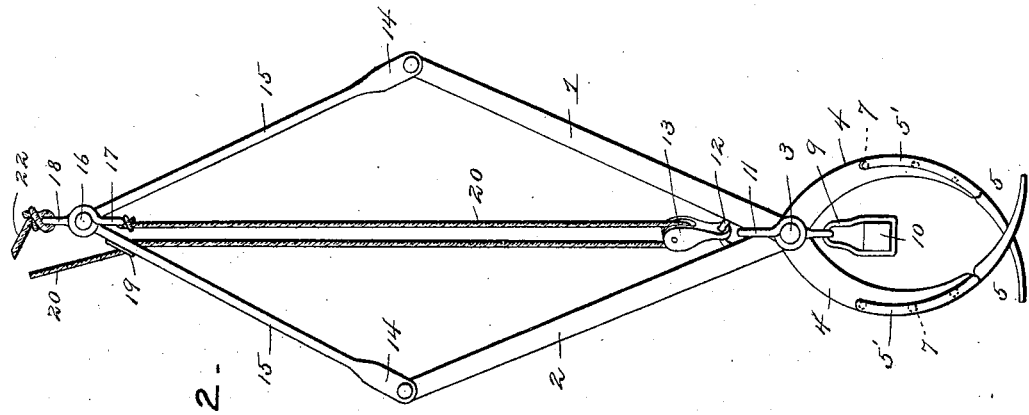
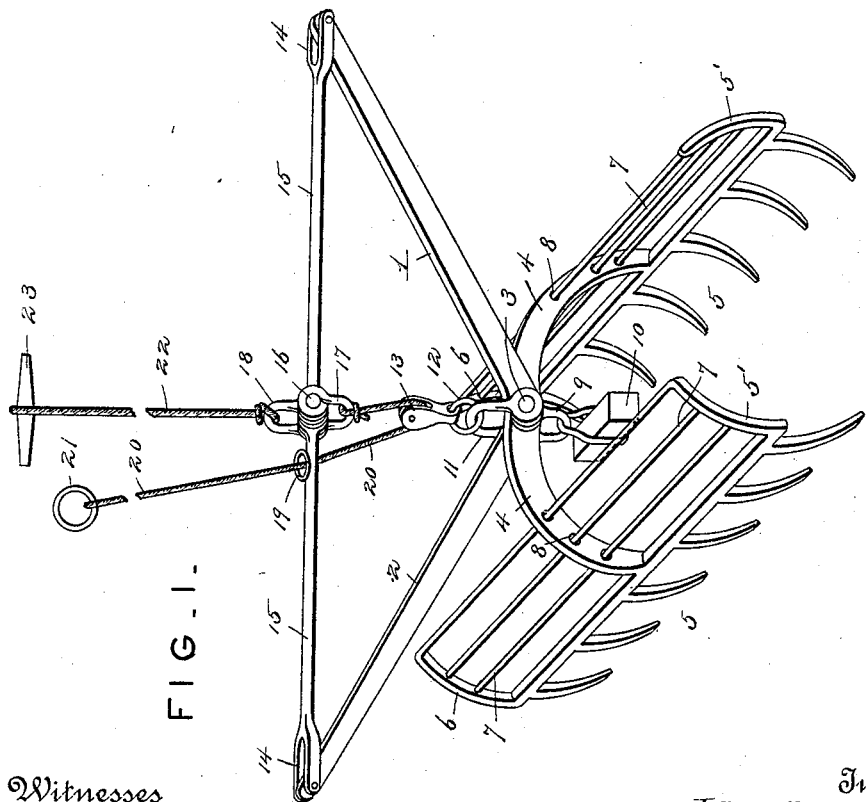
Witnesses
Harry L. Amer.
Inventors
John W. Steeves and
George A. Stewart.
By John Wedderburn
Attorney

UNITED STATES PATENT OFFICE.

JOHN WYCKLIFFE STEEVES AND GEORGE A. STEWART, OF ELLIOTT, MARYLAND.

AUTOMATIC OYSTER OR CLAM TONGS.

SPECIFICATION forming part of Letters Patent No. 588,539, dated August 17, 1897.

Application filed March 31, 1897. Serial No. 630,026. (No model.)

*To all whom it may concern:*

Be it known that we, JOHN WYCKLIFFE STEEVES, a subject of the Queen of Great Britain, and GEORGE A. STEWART, a citizen of the United States, residing at Elliott, in the county of Dorchester and State of Maryland, have invented certain new and useful Improvements in Automatic Oyster or Clam Tongs; and we do hereby declare the following to be a full, clear, and exact description of the invention, such as will enable others skilled in the art to which it appertains to make and use the same.

This invention relates to automatic oyster or clam tongs; and it consists, essentially, of oppositely-disposed members having levers attached to their upper ends, with mechanism in connection therewith for automatically opening and closing the tongs.

The invention further consists of the details of construction and arrangement, which will be more fully hereinafter described and claimed.

In devices of this character as heretofore constructed a great difficulty has been encountered by the inability to properly position the tongs over an oyster or clam bed to insure a beneficial gathering action and seizure by the tongs carrying a minimum load of oysters or clams far below the containing capacity of said tongs.

The object of the present invention is to obviate these difficulties by causing the tongs to spread to their full extent over an oyster or clam bed and to be held down firmly when so arranged to drag over a large surface and gather a large number of oysters or clams at each dip of the said tongs.

In the accompanying drawings, Figure 1 is a perspective view of a pair of automatic oyster and clam tongs embodying the invention and shown open in the act of tonging. Fig. 2 is an end elevation of the tongs shown closed and in inoperative position.

Referring to the drawings, wherein similar numerals of reference are employed to indicate corresponding parts in the views, the numerals 1 and 2 designate the opposite members, pivoted, as at 3, and from the pivotal point curved outward, as at 4, and have connected to or continuous with their lower ends rakes, with inturned curved teeth so positioned as to interlock with each other when the tongs are closed, as fully shown in Fig. 2. The opposite ends of the rake-heads are projected upwardly by curved arms 5 and 6, to which are suitably attached a series of cross-rods 7, freely extending through openings 8, formed in the outwardly-curved portions 4 of the lower ends of the members 1 and 2. The openings 8 are large enough to permit the cross-rods 7 to have yielding movement therein, and by this means fracture or injury to the said cross-rods is less liable to occur than if they were firmly fixed in the said outwardly-curved portions of the members 1 and 2. The said cross-rods 7 form grates which increase the capacity of the tongs and facilitate the tonging operation. From the pivotal point of the members 1 and 2 of the tongs a link 9 depends between the curved portions 4, and therefrom is movably suspended a weight 10. Also extending upwardly from the said pivotal point of the members 1 and 2 is a second link 11, which has movably secured thereto by means of a ring 12 a block 13, for a purpose which will be presently set forth.

The upper ends of the members 1 and 2 have the lower bifurcated ends 14 of levers 15 movably embracing the same, the said levers extending inwardly and movably held at the opposite ends on a cross-pin or pivot-bolt 16, from which also depends a link 17, rigidly carrying an oppositely-extending second link 18, and on one of the levers 15, adjacent to the said pivot-bolt, is fastened an eye 19. One end of a rope or small cable 20 is secured to the link 17 and then passed through the block 13 and upwardly through the eye 19, having on the free end thereof a ring or analogous operating device 21. To the link 18 is secured another rope or cable 22, having a suitable grip 23 on the end of the same. In operation the rope or cable 22 is held in the left hand by means of its grip 23, and the ring 21 on the rope or cable 20 is held in the right hand. The automatic tongs are then lowered into the water from the side of the boat and at the same time a gentle pull is exerted on the rope or cable 20, thereby opening the rakes and the members carrying the same to their full extent to cause them to spread over a large surface or bed of oysters or clams. Then by gradually drawing upwardly on the rope or cable 22 and allowing the rope or cable 20 to move slowly the rakes and the members carrying the same are drawn toward each other without raising the said rakes from the oyster or clam bed. This insures a thorough gathering action and draws the oysters or clams to the center, thereby filling the rakes and the grates above the same, and when this is accomplished the tongs will be elevated and held against accidental separation by the rope or cable 22 and their contents deposited in a boat or other receptacle. The weight 10 assists in holding the rakes down and increases the entire weight of the lower portion of the tongs without making the parts cumbersome or enlarging them unnecessarily. It will be seen that the tongs, as set forth, are automatic in their action through the interposition of simple attachments, all conveniently operated from a boat or other place.

It is obviously apparent that many minor changes in the details of construction might be made and substituted for those shown and described without in the least departing from the nature or spirit of the invention.

Having thus described the invention, what is claimed as new is—

1. In an automatic oyster and clam tongs, the combination of members pivoted to each other having racks on their lower ends, levers movably connected to the upper portions of the said members and extended inwardly and movably united at the center, links attached to the pivotal point of said members and located above and below the same, a link depending from the pivotal point of said members, a weight carried by the said link, a cord or cable passing through the eye on one of said levers and the block, and attached to the lower link located at the pivotal point of said levers, and another cord or cable attached to the link above the pivotal point of said levers, substantially as and for the purposes specified.

2. In an automatic oyster and clam tongs, the combination of members pivoted to each other and having rakes on their lower ends, a link loosely depending from the pivotal connection of said members having a weight movably carried thereby, an upper link movably attached to said pivotal connection of the members, a block loosely secured to the said upper link, a pair of levers attached to the upper ends of the members and extending inwardly and united at their central portions by a pivotal connection, links extending above and below the pivotal connection of said levers, an eye carried by one of the said levers to one side of its pivotal point, a cord or cable passing through the said eye and the block, and having its free end attached to the lower link depending from the pivotal connection of the levers, and another cord or cable attached to the upper link held by the pivotal connection of the levers, substantially as and for the purposes specified.

In testimony whereof we have signed this specification in the presence of two subscribing witnesses.

JOHN WYCKLIFFE STEEVES.
GEO. A. STEWART.

Witnesses:
T. H. MOORE,
WALTER M. HARPER.